(12) United States Patent
Shand et al.

(10) Patent No.: US 7,808,890 B2
(45) Date of Patent: Oct. 5, 2010

(54) FORWARDING DATA IN A DATA COMMUNICATIONS NETWORK

(75) Inventors: Ian Michael Charles Shand, Reading (GB); Stewart Frederick Bryant, Reading (GB)

(73) Assignee: Cisco Technology, Inc., San Jose, CA (US)

( * ) Notice: Subject to any disclaimer, the term of this patent is extended or adjusted under 35 U.S.C. 154(b) by 155 days.

(21) Appl. No.: 11/839,687

(22) Filed: Aug. 16, 2007

(65) Prior Publication Data

US 2009/0046576 A1    Feb. 19, 2009

(51) Int. Cl.
*G01R 31/08* (2006.01)
*H04L 12/50* (2006.01)

(52) U.S. Cl. .................. 370/217; 370/357

(58) Field of Classification Search .......... 370/217, 370/357
See application file for complete search history.

(56) References Cited

U.S. PATENT DOCUMENTS

| | | | |
|---|---|---|---|
| 7,002,975 B2 * | 2/2006 | Galicki et al. ........... | 370/401 |
| 7,012,887 B2 * | 3/2006 | Zhu et al. ............... | 370/216 |
| 7,197,664 B2 * | 3/2007 | Khosravi ................ | 714/12 |
| 7,280,472 B2 * | 10/2007 | Rigby et al. ........... | 370/230.1 |
| 7,346,674 B1 * | 3/2008 | Gallagher et al. ...... | 709/223 |
| 7,355,975 B2 * | 4/2008 | Liu et al. .............. | 370/235 |

OTHER PUBLICATIONS

Link-State Routing Protocol. Wikipedia, the free encyclopedia. [retrieved on Sep. 4, 2008]. Retrieved from the Internet: <URL: http://en.wikipedia.org/wiki/Link-state_routing_protocol>.
Khanna, A., Zinky, J. The Revised ARPANET Routing Metric. Jul. 1987. [Retrieved on Sep. 4, 2008]. Retrieved from the Internet: <URL: http://www.cs.princeton.edu/~jrex/teaching/spring2005/reading/khanna89.pdf>.
Choi, S., Chung M., Yang, M., Kin T., Park J. An Enhanced Simple-Adaptive Link State Update Algorithm for QoS Routing. IEICI—Transactions on Communications. vol. 390-B, No. 11. Retrieved from the Internet: <URL: http://ietcom.oxfordjournals.org/cgi/content/refs/E90-B/11/3117?ck=nck>.
Understanding Spanning—Tree Protocol. Cisco Documentation. 1997 [retrieved on Sep. 4, 2008]. Retrieved from the Internet: <URL: http://www.cisco.com/univercd/cc/td/doc/product/rtrmgmt/sw_ntman/cwsimain/cwsi2/cwsiug2/vlan2/stpapp.htm>.

* cited by examiner

*Primary Examiner*—Nick Corsaro
*Assistant Examiner*—Sowmini Nair
(74) *Attorney, Agent, or Firm*—Hickman Palermo Truong & Becker LLP

(57) ABSTRACT

An apparatus for forwarding data in a data communications network having as components nodes and links there between, the apparatus being arranged to forward data to a receiving node via a primary path the apparatus further having a repair capability of computing a repair path around a failure component in the primary path to an address having a repair identifier for the receiving node not via the failure component, the apparatus being arranged to forward data to the receiving node via the repair path upon failure of the failure component if a node in the primary path to the receiving node does not have said repair capability.

30 Claims, 8 Drawing Sheets

FIG. 3

| NEIGHBOUR | METRIC | NOTVIA ADDRESS |
|---|---|---|
| A | $\alpha$ | a.a.a.a. $(P\bar{a})$ |
| B | $\beta$ | b.b.b.b $(P\bar{b})$ |
| C | $\gamma$ | c.c.c.c $(P\bar{c})$ |
| S | $\zeta$ | d.d.d.d $(P\bar{d})$ |

FIG. 4

| DESTINATION ADDRESS | NEXT_HOP | REPAIR ADDRESS | REPAIR NEXT_HOP |
|---|---|---|---|
| B | P | $B\bar{p}$ | Z |
| D | P | $B\bar{p}$ | Z |
| A | P | $A\bar{p}$ | $\Omega_1$ |
| $C\bar{p}$ | Y | --- | |

| DESTINATION | NEXT HOP | REPAIR ADDRESS | REPAIR NEXT HOP |
|---|---|---|---|
| R | A | Ba | X |

| DESTINATION | NEXT HOP | REPAIR ADDRESS | REPAIR NEXT HOP |
|---|---|---|---|
| R | C | Ba | C |

FORWARDING DATA IN A DATA COMMUNICATIONS NETWORK

CROSS-REFERENCE TO RELATED APPLICATIONS

This application is related to co-pending patent application U.S. Ser. No. 11/064,275, filed Feb. 22, 2005, entitled "Method and Apparatus for Constructing a Repair Path Around a Non-Available Component in a Data Communications Network" of Michael Shand et al.

TECHNICAL FIELD

The present disclosure generally relates to data communications networks. The disclosure relates more specifically to an apparatus and method for forwarding data in a data communications network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers or switches directing the packet along one or more of a plurality of links connected to it) according to one of various routing protocols.

One class of routing protocol is a link state protocol. A link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB), which is a map of the entire network topology, and from that constructs generally a single optimum route to each available node based on an appropriate algorithm such as, for example, a shortest path first (SPF) algorithm. As a result a "spanning tree" (SPT) is constructed, rooted at the node and showing an optimum path including intermediate nodes to each available destination node. The results of the SPF algorithm are stored in a routing information base (RIB) and based on these results the forwarding information base (FIB) or forwarding table is updated to control forwarding of packets appropriately. When there is a network change an LSP representing the change is flooded through the network by each node adjacent the change, each node receiving the LSP sending it to each adjacent node.

As a result, when a data packet for a destination node arrives at a node the node identifies the optimum route to that destination and forwards the packet to the next node along that route. The next node repeats this step and so forth.

In normal forwarding each node decides, irrespective of the node from which it received a packet, the next node to which the packet should be forwarded. In some instances this can give rise to a "loop." In particular a loop can occur when the databases (and corresponding forwarding information) are temporarily de-synchronized during a routing transition, that is, where because of a change in the network, a new LSP is propagated that induces creating a loop in the RIB or FIB. As an example, if node A sends a packet to node Z via node B, comprising the optimum route according to its SPF, a situation can arise where node B, according to its SPF determines that the best route to node Z is via node A and sends the packet back. This can continue for as long as the loop remains, although usually a node will impose on each packet a maximum hop count, after which the packet will be discarded. Such a loop can be a direct loop between two nodes or an indirect loop around a circuit of nodes.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a schematic representation of information carried in an LSP;

FIG. 4 illustrates a forwarding table constructed at a neigbour node to a non-available node;

DETAILED DESCRIPTION

A method and apparatus for forwarding data in a data communication network are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Apparatus and method for forwarding data in a data communications network
4.0 Implementation Mechanisms—Hardware Overview
5.0 Extensions and Alternatives
1.0 General Overview In one embodiment, an apparatus for forwarding data in a data communications network having as components nodes and links therebetween, the apparatus being arranged to forward data to a receiving node via a primary path the apparatus further having a repair capability of computing a repair path around a failure component in the primary path to an address having a repair identifier for the receiving node not via the failure component, the apparatus being arranged to forward data to the receiving via the repair path upon failure of the failure component if a node in the primary path to the receiving node does not have said repair capability.

In other aspects, the invention encompasses a computer-implemented method and a computer-readable medium configured according to the foregoing arrangement.

2.0 Structural and Functional Overview

Figure 1:
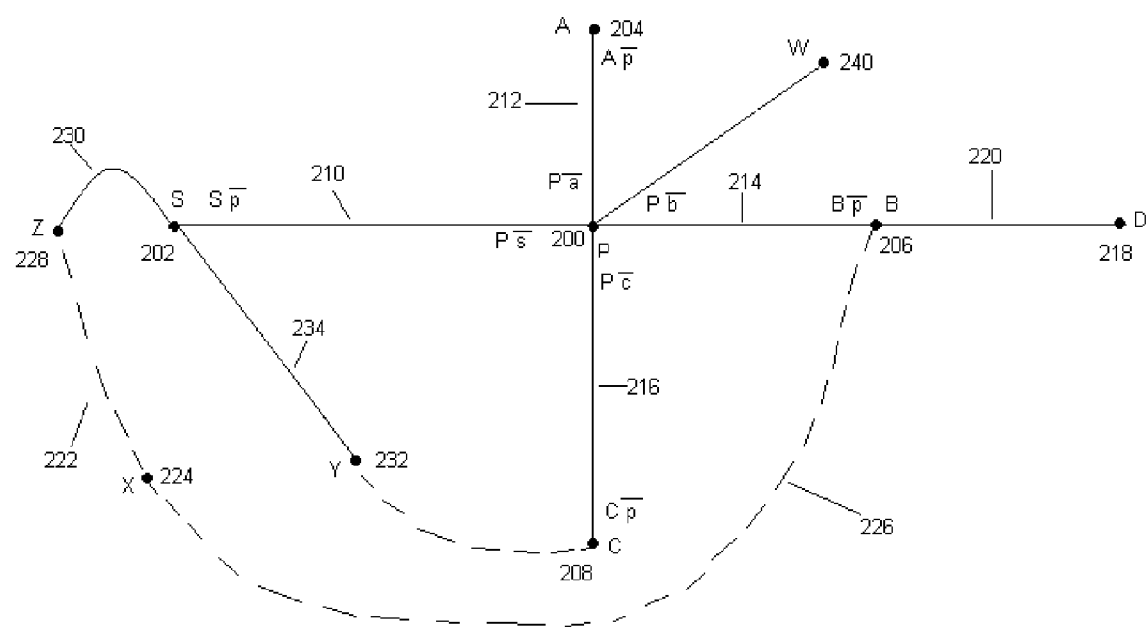
FIG. 1 illustrates a network.

FIG. 1 illustrates a network. The network includes a primary node P, reference numeral 200, a source node S, and nodes, A, B and C, reference numerals 202, 204, 206, 208 each connected to node P via respective links 210, 212, 214, 216. A further node D, reference numeral 218 is connected to node B via link 220.

In addition to the standard addresses assigned to each node, each interface in the network is assigned an additional repair address. This is termed here the "notvia address" although the term is arbitrary and non-limiting and is adopted purely for convenience. A packet addressed to a notvia address must be delivered to the router with that address, and not via the neighboring router on the interface to which that address is assigned.

For example the interfaces from node P to nodes S, A, B, C by respective links 210, 212, 214, 216, may have addresses P$\bar{a}$, P$\bar{b}$, P$\bar{b}$ and P$\bar{s}$. Similarly the interfaces from nodes A, B, C and S to node P via links 212, 214, 216, 210 respectively in the opposite direction have addresses A $\bar{p}$, B$\bar{p}$, C$\bar{p}$, S$\bar{p}$.

To repair a failure, a repairing node, for example node S, encapsulates the packet to the notvia address of the node interface on the far side of the failure. The nodes on the repair path then know to which node they must deliver the packet, and which network component they must avoid.

Referring to FIG. 1, assuming that S has a packet for some destination D that it would normally send via P and B, and that S suspects that P has failed, S encapsulates the packet to B $\bar{p}$. The path from S to B$\bar{p}$ is, according to the semantic the shortest path from S to B not going via P. If the network contains a path from S to B that does not transit router P, then the packet will be successfully delivered to B. For example the packet may be forwarded along path 222 to node X, 224, and then path 226 to node D. Because node X has calculated a repair path for B $\bar{p}$ it will forward the encapsulated packet correctly. When the packet addressed to B$\bar{p}$ arrives at B, B removes the encapsulation and forwards the repaired packet towards its final destination, node D.

Figure 2:
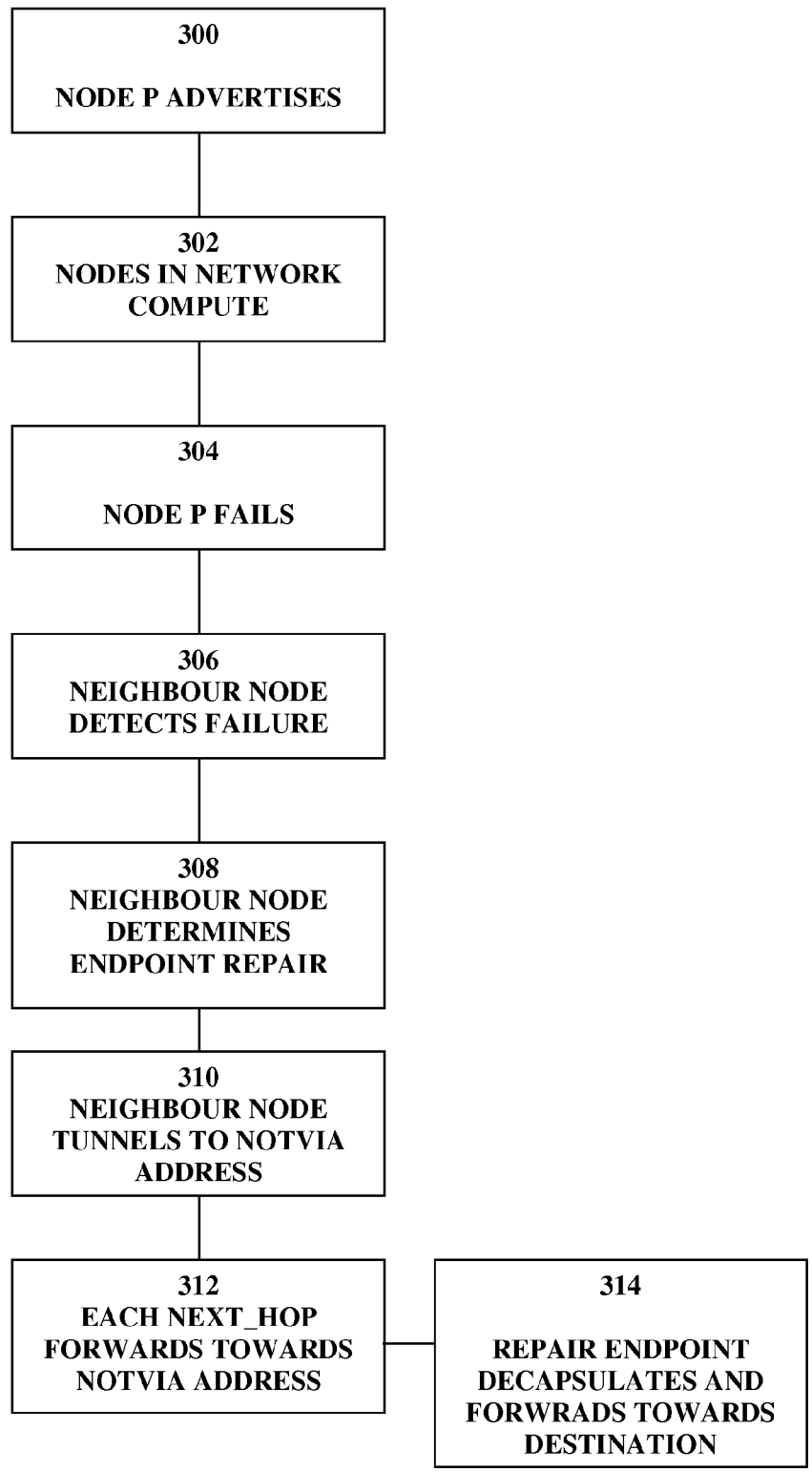
FIG. 2 illustrates a method of constructing a repair path.

The approach can be further understood with reference to FIG. 2. FIG. 2 illustrates a method of constructing a repair path. In block 300 node P advertises, using a notification such as an LSP, its adjacencies A, B, C, S and its associated notvia addresses P$\bar{a}$, P$\bar{b}$, P$\bar{c}$, P $\bar{s}$. It will be appreciated that all other nodes, acting as notifying node will also issue similar LSPs. As a result not only can appropriate forwarding tables be constructed, but also notvia addresses are available for each node in the event that it fails or otherwise becomes a non-available node, in which case the notvia address can be used as the repair address. Accordingly, in block 302, all participating nodes compute their next hops not only for each normal (non-failed) address but also for each notvia address. As a result each node constructs a repair path around each other node in the network and stores it against the corresponding notvia address.

In the event that node P subsequently fails or otherwise becomes unavailable, in block 304, then in block 306 the neighbor nodes detect or are notified of the failure in any appropriate manner. Where a neighbor node subsequently receives a packet which it would have sent to the failed component as its next hop then, acting as a repairing node, the neighbor node identifies a repair end point or target to which it must tunnel such a packet to reach its subsequent destination in block 308. In the example given above, the repairing node is node S, and repair end point is node B for a packet with destination D. In particular this is identified by the respective notvia address B$\bar{p}$. As a result the node S tunnels the packet along the repair path to B$\bar{p}$ in block 310. In block 312 each next hop forwards the encapsulated packet towards the notvia address B$\bar{p}$, for example node X in FIG. 1 forwards the packet correctly. Because all of the participating nodes have calculated a path to the notvia address using the same repair topology, a packet is forwarded using normal IP forwarding without the requirement for extensions to the forwarding code. In block 314 the packet arrives at the repair end point which decapsulates it and forwards the original packet towards its destination, again using normal IP forwarding for destination D in the example described.

To allow each enabled node on the network to construct a repair topology for a failed network component (link or node) each node must advertise its notvia addresses as well as the other relevant information stored in its LSP. FIG. 3 is a schematic representation of information carried in an LSP. FIG. 3 schematically shows the information contained in an LSP issued by node P. In addition to advertisement of each neighbor and its associated metric (e.g. the cost associated with the respective link) further information is provided. For example where the neighbor information is provided in column 400 and the associated metric in column 402, in addition a notvia address for each neighbor is provided in column 404. The notvia address is associated with the respective neighbor such that the entry against neighbor A effectively designates P$\bar{a}$. As long as the semantic is recognized by nodes receiving the LSP then the notvia address itself can take the form of a standard IP address shown schematically here as a.a.a.a representing P$\bar{a}$ and so forth. It will be seen that, as every node in the network provides similar information, each node can derive repair paths for every notvia address on the network.

As a result, referring once again to the example described with reference to FIG. 1 in which node S encapsulates a packet destined for node D to P$\bar{b}$ in the event of failure of node P, every node more generally calculates the path it would use in the event of any possible node failure. Each node therefore fails every other router in the network, one at a time, and calculates its own best route to each of the neighbors of that node. In other words, again with reference to FIG. 1, some router X will consider each router in turn to be P, fail P, and then calculate its own route to each of the notvia P addresses advertised by the neighbors of P. i.e. X calculates its route to S$\bar{p}$, A$\bar{p}$, B$\bar{p}$ and C$\bar{p}$, in each case, notvia P.

FIG. 4 illustrates a forwarding table constructed at a neighbor node to a non-available node. Referring to FIG. 4, illustrating relevant parts of the forwarding table derived at node S, it will be seen that for each address (column 500) the next hop (column 502) is derived, a notvia address (column 504) is designated and a corresponding repair address (column 506) is also implemented. For example where the destination is node B and the next hop is calculated as node P then, in addition, the repair address B$\bar{p}$ to which the packet will be tunneled is stored together with the corresponding repair next hop. In this case this is the first hop along the path 222 from node S to node X in the example described above with reference to FIG. 1, indicated as node Z, reference numeral 228 along link 230 from node S. In the case of packets destined for node D, the normal next hop is node P and the repair address is $\overline{Bp}$ as a result of which the repair next hop is once again node Z for packets encapsulated to $\overline{Bp}$. In the case of node A as destination address, the next hop is node P and the repair address is $\overline{Ap}$ providing some repair next hop $\Omega_1$ (not shown). The repair addresses in node S's forwarding table will always be to a neighbor's neighbor, i.e. the repair tunnel endpoint. However it will be seen that where the normal address in column 500 is a notvia address, for example $\overline{Cp}$, then although a next hop is provided as node Y, reference numeral 232 along link 234 from node S, a repair address and repair next hop are not provided as described in more detail below. As a result, node S will forward a packet using normal forwarding to a notvia address, when it lies in another node's repair path, but will not instigate a repair tunneled to a notvia address when the incoming packet is already destined for a notvia address.

When using such a notvia repair mechanism to repair a failure in the network whether a link or node, the repair is usually made by the node adjacent to the failed component. In some cases, however, the node adjacent to the failed component may not have the capability to make the repair. For example it may be deficient in hardware support or software. The following approach addresses the preceding issues.

Figure 5:
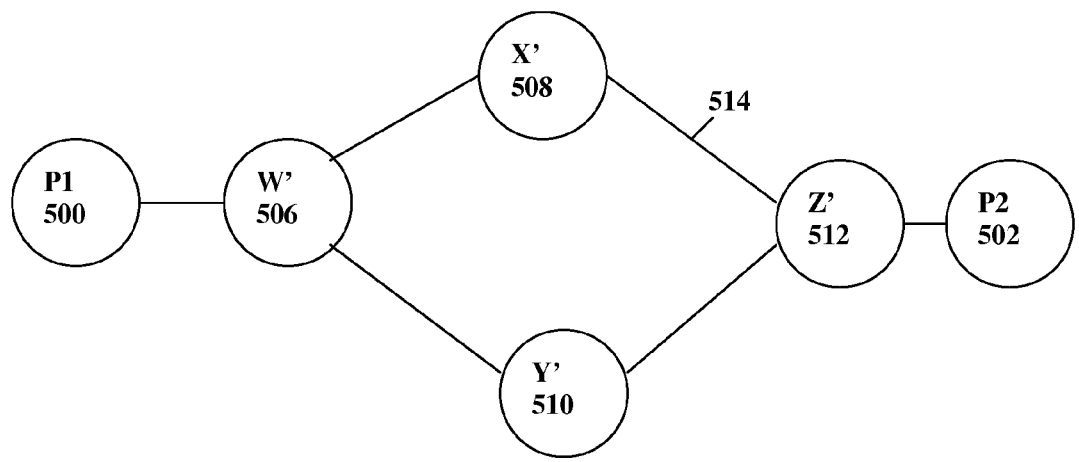
FIG. 5 illustrates a network for a high level application of approach described herein.
Figure 6:
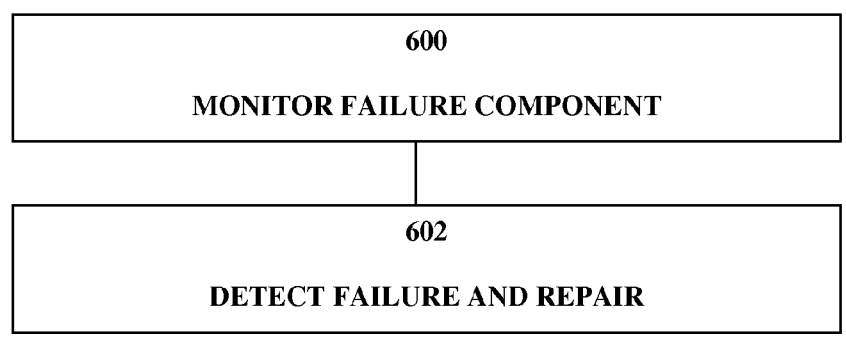
FIG. 6 illustrates a high level view of an approach for forwarding data.

In overview, a method and apparatus for forwarding data in a data communications network according to the approach described herein can be understood with reference to FIG. 5 and FIG. 6. FIG. 5 illustrates a network for a high level application of approach described herein; FIG. 6 illustrates a high level view of an approach for forwarding data.

Referring first to FIG. 5, in the simple network configuration shown a first node P1 (reference numeral 500) can be, for example, a source node or a forwarding node for a data packet and a second node P2, reference numeral 502, can be a receiving node or destination node for the data packet. Connectivity between the provider edges is achieved via nodes $W^1, X^1, Y^1, Z^1$, reference numerals 506, 508, 510, 512. In the case, for example, that node $Y^1$ is notvia repair capable and node $X^1$ is not notvia repair capable then node $W^1$ acting as repairing node can create a notvia repair path for failure of a link 514 between nodes $X^1$ and $Z^1$ in the event of failure of link 514 using node $Y^1$. As can be seen in more detail below, the approach can be implemented by any notvia repair capable node allowing a notvia repair to be put in place by one or more alternative nodes to a neighbor node (such a node $W^1$) to a failure even if the neighbor itself does not support initiating a notvia repair. Accordingly packets can be tunneled around the failure by any upstream router provided that it is aware of the failure.

Turning to FIG. 6 the steps performed at an apparatus for forwarding data comprising a repair node can be further understood. A repairing node which may be a source node or a node along a path between a source and destination node is arranged to forward data to a receiving node which may be the packet destination or a node on the path to a packet destination via a primary path. However a node between the repairing node and the receiving node in the primary path does not have notvia repair capability, that is, the capability of computing a repair path around a failure component in the primary path to an address having a repair identifier, such as a repair address for the receiving node and not via the failure component.

Accordingly at step 600 the repairing node monitors the failure component in order to detect a failure. The failure component is typically the node or link adjacent to the receiving node through which data packets would pass on the primary path from the repairing node.

Under normal operation of notvia repairs, the repairing node would not be made aware of the failure until it was required to converge the network as it is not adjacent to the failure (as there must be at least a non-capable node between it and the failure component). However monitoring can be set up in any appropriate manner for example by running a multi-hop bi-directional forwarding detection (BFD) session across the failure component to the receiving node.

At step 602, upon detecting failure of the failure component, the monitoring or repairing node can begin tunneling packets for destinations which would have traversed the failure using the appropriate notvia repair address. Because all of the routers in the network will have computed their own repair paths for that notvia address (based on a topology excluding the failure component and any nodes—such as node A—incapable of performing a notvia calculation), the packet will be tunneled to the receiving node at the far side of the failure, decapsulated there and forwarded on normally to the destination even though it was injected into the notvia path by a node not adjacent to the failure.

The repairing node can be any notvia-capable node in the network and may not even be the nearest notvia capable node to the failure as described in more detail below. The repair address can take any form of address having a repair identifier. According to a further aspect, traffic entering the network via a non notvia capable router can be repaired, once an adjacent failure is detected at the router, by forwarding to a notvia capable router which will then inject it into a notvia repair path.

As a result of the arrangement described herein, a node or router with critical traffic can form a fast re-route repair around a downstream component which is not notvia capable.

3.0 Apparatus and Method for Forwarding Data in a Data Communications Network

Figure 7:
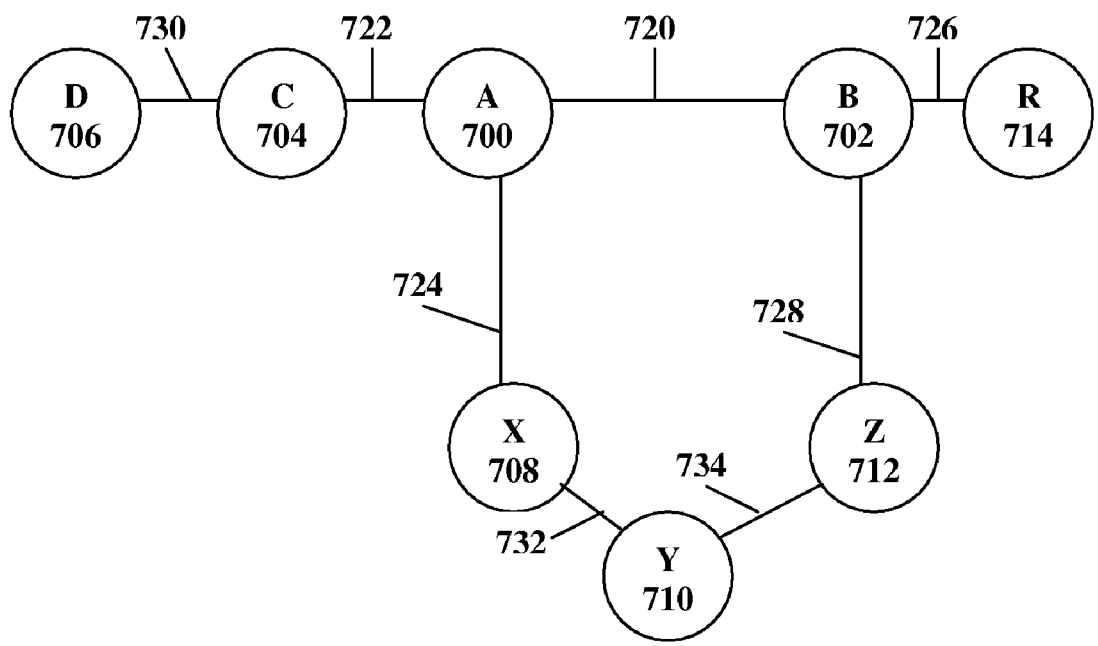
FIG. 7 illustrates a network for describing in more detail the approach of FIG. 6.
Figure 8:
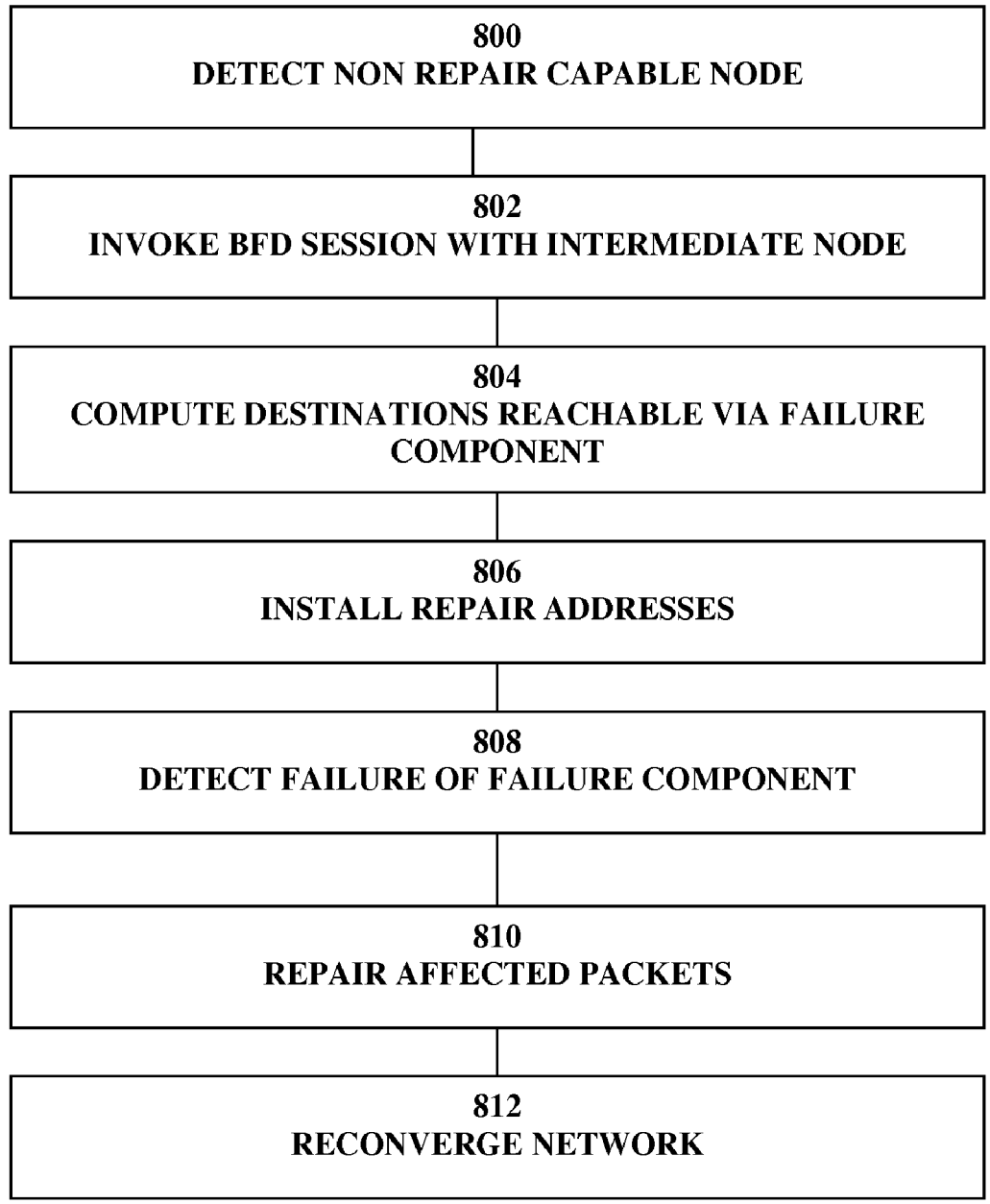
FIG. 8 illustrates the approach of FIG. 6 in more detail.
Figures 9A, 9B, 10:
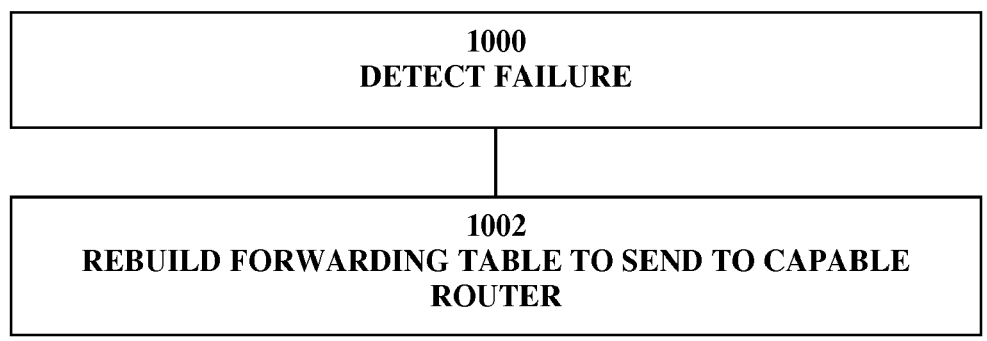
FIG. 9A illustrates a forwarding table constructed according to the approach herein at a first repairing node.
FIG. 9B illustrates a forwarding table constructed at a second repairing node.
FIG. 10 illustrates the approach described herein at a non-repair capable node.

FIG. 7 illustrates a network for describing in more detail the approach of FIG. 6; FIG. 8 illustrates the approach of FIG. 6 in more detail; FIG. 9A illustrates a forwarding table constructed according to the approach herein at a first repairing node; FIG. 9B illustrates a forwarding table constructed at a second repairing node.

Referring firstly to FIG. 7 a network in relation to which the approach described herein can be implemented includes nodes A, B, C, D, reference numerals 700, 702, 704, 706, nodes X, Y, Z reference numerals 708, 710, 712 and node R reference numeral 714. Node A is connected to nodes B, C and X by links 720, 722 and 724 respectively. Node B is connected to nodes R and Z by links 726, 728 respectively. Node D is connected to node C by link 730 and node Y is connected to nodes X and Z by links 732, 734 respectively. All links have a cost 1 such that for data packets with destination node R, the primary route from node D and C is via nodes A and B. In order to protect link 720 between nodes A and B, node B would advertise its notvia address Ba and nodes A, C, D, X, Y, Z would compute their repair path for Ba in the manner described above with reference to FIG. 1. However in the event that node A does not have notvia repair capability then other nodes with notvia capability can perform proxy notvia repair in the manner described herein. Such nodes can include neighbor nodes such as nodes C and X as well as nodes yet further upstream such as node D.

The approach can be further understood with reference to FIG. 8. At step 800, performed at a repairing node such as proxy repair node C or D, a non repair capable node such as node A is detected. For example this can be on the basis of monitoring of capability advertisements of adjacent or other nodes. Normally in notvia schemes this would indicate that the adjacent node was protecting the component using notvia.

If, however, it does not indicate that it is protecting the component (for example node B or link AB as failure component) one or more other nodes can perform the notvia function, for example node C or node D.

At step 802 the repairing node invokes a multi-hop path validation protocol such as a multi-hop BFD session across the non-capable component to the downstream router for example the immediate node, node B. BFD sessions are known to the skilled reader and described for example in the document "draft-ietf-bfd-base," which is available at the time of this writing in the folder /wg/bfd of the domain "tools.ietf.org" on the Internet, such that detailed description is not required here. The session must use one of the normal addresses of the downstream router, that is, along the primary path, so that failure of link AB will cause the BFD session to fail indicating that repair is required.

At step 804 the repairing node computes destinations reachable via the failure component, link 720 as a primary path. Referring to FIG. 7 this includes node B itself and nodes R and nodes Z but it will be appreciated that any level of complexity and connectivity of network can implemented in this manner. For example the set of destinations which would normally traverse the failure component can be obtained by recording this information during running of the normal SPF algorithm.

At step 806 the forwarding tables at the repairing node are updated with the repair address for example the notvia address and next hop per destination. FIG. 9A shows a forwarding table installed at node C for destination R and FIG. 9B shows a forwarding table installed for destination R at node D. Referring firstly to FIG. 9A, therefore, for destination R, along the primary path the next hop is node A. The relevant not via repair address is Ba and the repair next hop (assuming appropriate connectivity-not shown) is node X.

Referring to FIG. 9B, at node D the primary path next hop for destination R is node C and the next hop for repair address Ba is node C as well. It will be noted that node A may be non notvia capable in the sense that it can compute notvia forwarding routes but cannot institute a repair (e.g. encapsulating and forwarding a packet to a repair address) itself. In this case the repairing node still needs to compute and instigate a repair path but can include node A in its not via calculations.

Typically the closest router, that is the immediate neighbor of the incapable router which would send traffic over the potentially failing component which is node C in the case of non repair capable node A, is the one which will be required to perform the proxy repair mechanism described herein. However the mechanism herein also works if other routers also perform this action. For example if node C and D both provide proxy repair, acting as repairing nodes for link 720, then upon failure of link 720 both BFD sessions will fail and both nodes C and D will initiate notvia repairs. However the notvia repair provided by node C will result in node D's BFD session beginning to work again and hence node D will withdraw its notvia repair. Indeed in general more than one router will be required to protect a remote component because traffic may arrive at the adjacent node from multiple other routers, (for example in the case of node A, both nodes X—assuming other connectivity and node C).

Referring to FIG. 8, at step 808 the repairing node monitors for and detects any failure in the protected component, failure component 720 in the present example, and at step 810 the repairing node then invokes the appropriate repair for packets destined for a destination reachable by the primary path over the failure component. In particular any such data packets are forwarded to the repair notvia address. Of course the repair can be torn down once the network has reconverged at step 812.

It will be appreciated that these steps setout above with reference to FIG. 8 can be performed in any appropriate order. For example the BFD session can be invoked only once the destinations reachable via the failure component have been computed to establish whether any such session is required.

According to the method described above, all traffic can be repaired except that entering the network at the incapable router (for example node A) itself. However this traffic can be protected in the manner shown in FIG. 10. FIG. 10 illustrates the approach described herein at a non-repair capable node. An example of a non-repair capable router for purposes of description may be node A. At step 1000 the non-repair capable router detects the relevant failure, for example failure of link 720. At step 1002 the node rebuilds its forwarding table, for example its FIB, to reflect the failure such that its next hop is a repair capable neighbor, preferably the repair capable neighbor furthest downstream in the repair path. That router will then inject the traffic into its notvia repair as normal. This can happen quickly as since it doesn't involve any communication with any other nodes.

The approach described herein can be implemented in relation to link failure or node failure as appropriate. For example in the case where node B comprises the failure component and node A is not repair capable then node C will seek other connectivity (not shown) providing a not via repair path for nodes R and Z.

Alternative repair mechanisms such as loop free alternates (LFA) may be in place LFAs comprise neighbor nodes to a repairing node that have a cost to a destination node that is less than the cost of the neighbor node to the repairing node plus the cost from the repairing node to the destination node. LFAs can be implemented to replace notvia repairs where destinations are served by such alternative repairs. Any notvia repair capable node could additionally perform LFA computations for non-adjacent failures if required.

Although the discussion above is provided in the context of a single routing domain or autonomous system, a similar approach can be implemented across multiple domains using for example border gateway protocol (BGP) using the path vector to identify which destinations require repairing for a given failure component.

Similarly, although the discussion above relates to a notvia repair mechanism where the repair address comprises a notvia repair address, the approach could equally well be implemented in a multitopology routing context where different topologies are constructed and overlaid on the base topology shown using different address spaces for each topology. In that case the repair address would comprise an address in an alternative topology to the base topology and hence having a repair identifier, for example, a repair topology omitting the failure component. Of course the not via repair path itself can be computed in any appropriate manner.

The various steps and approaches discussed herein however can be implemented in any appropriate manner in software, hardware or firmware. Detection of non-repair capable nodes can be performed in any appropriate manner and monitoring of the failure component similarly can be performed using BFD or any other appropriate monitoring approach. Installation and invoking of the repair can be implemented at each node by appropriate modification of the routing and forwarding algorithm and any steps performed at a non-capable router upon detection of failure can be implemented in any appropriate manner.

4.0 Implementation Mechanisms—Hardware Overview

Figure 11:
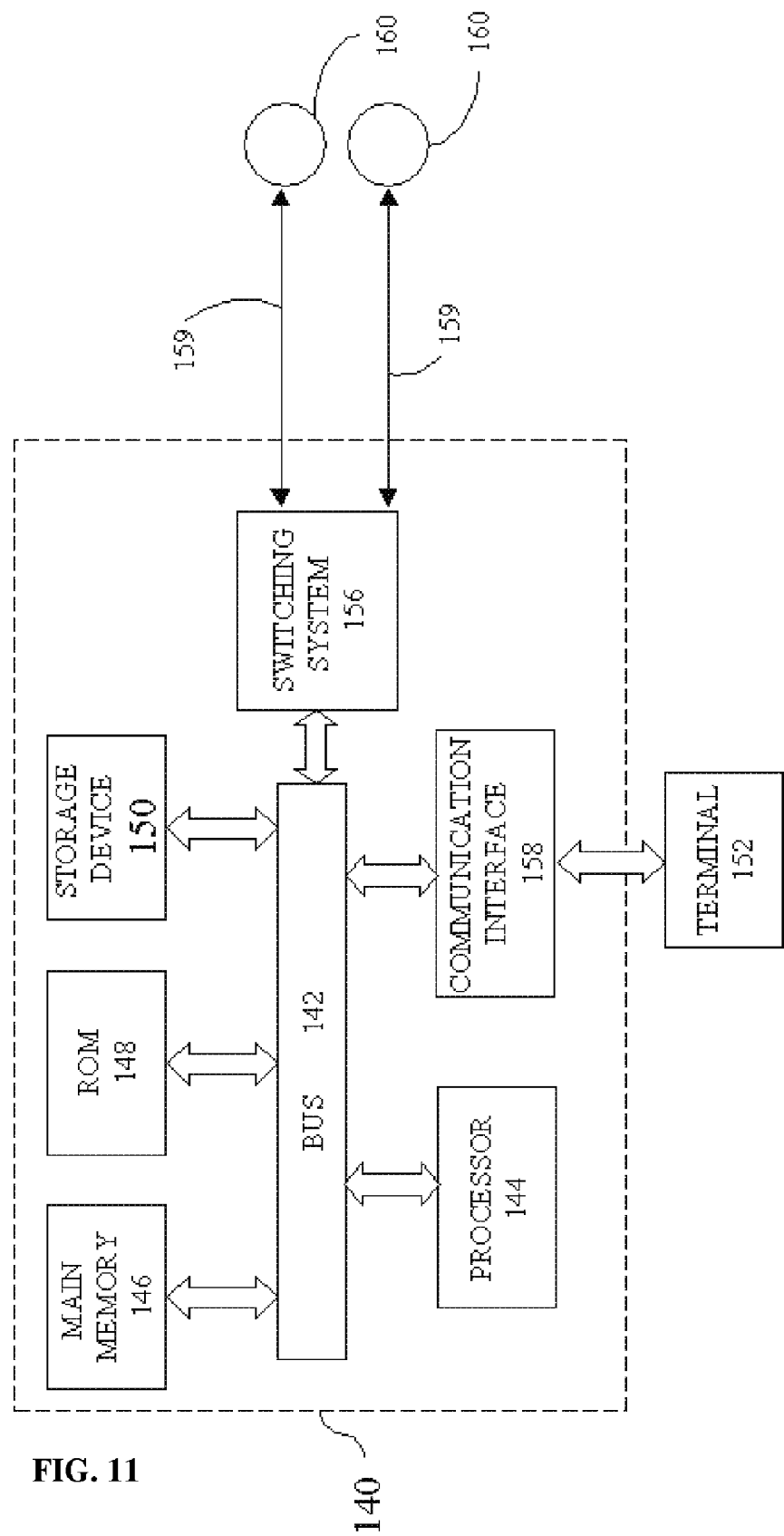
FIG. 11 illustrates a computer system with which an approach for forwarding data may be implemented.

FIG. 11 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a, repairing node, non-repair capable node or intermediate node the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism and forwarding paradigm can be adopted to implement the invention. The method steps set out can be carried out in any appropriate order and aspects from the examples and embodiments described juxtaposed or interchanged as appropriate.

The apparatus described herein can be implemented in any connectionless hop-by-hop network, where each router makes an autonomous routing decision, for example a pure IP network.

What is claimed is:

1. An apparatus comprising:
    one or more processors;
    logic configured to forward data to a receiving node in a network, while the receiving node is operational, via a primary path;
    logic configured to forward data to the receiving node, while the receiving node is not operational, via a repair path according to a repair capability, when a node in the primary path to the receiving node does not have the repair capability;
    logic configured to compute a repair path around a failure component, by;
        identifying a second node which is adjacent to the failure component;
        identifying a port of the second node to which the failure component would have normally forwarded the data;
        computing the repair path to an address having a repair identifier for the receiving node that is to the identified port of the second node and not via the failure component;
        wherein the repair path includes the first node and the second node.

2. An apparatus as claimed in claim 1 in which the receiving node comprises a destination node for a data or a node on a primary path to a destination node.

3. An apparatus as claimed in claim 1, further comprising logic configured to detect failure of the failure component.

4. An apparatus as claimed in claim 3 further comprising logic configured to invoke a bi-directional forwarding detection session with the receiving node over the failure component to detect failure thereof.

5. An apparatus as claimed in claim 1 in which the address having a repair identifier for the receiving node comprises a notvia address.

6. An apparatus as claimed in claim 1 in which the address having a repair identifier for the receiving node comprises an alternative topology address.

7. An apparatus as claimed in claim 1, further comprising logic configured to compute a loop free alternate repair path where available.

8. The apparatus of claim 1, wherein the repair path is computed or constructed after the receiving node becomes not operational.

9. A method of forwarding data in a data communications network having as components nodes and links there between in which data for a receiving node is forwarded via a primary path receiving node, the method comprising:
    forwarding data in a data communications network having as components nodes and links there between in which data for a receiving node, when the receiving node is operational, is forwarded via a primary path receiving node;
    forwarding data to the receiving node, when the receiving node is not operational, via a repair path according to a repair capability, when a first node in the primary path to the receiving node does not have the repair capability;
    computing a repair path around a failure component in the primary path, by:
        identifying a second node which is adjacent to the failure component;
        identifying a port of the second node to which the failure component would have normally forwarded the data;
        computing the repair path to an address having a repair identifier for the receiving node that is to the identified port of the second node and not via the failure component;
        wherein the repair path includes the first node and the second node;
    wherein the method is performed by one or more processors.

10. A method as claimed in claim 9 further comprising detecting a non repair-capable node in the primary path.

11. A method as claimed in claim 9 further comprising detecting failure of the failure component and forwarding data via the repair path.

12. A method as claimed in claim 9 further comprising invoking a bidirectional forwarding protection session over the failure component to detect failure thereof.

13. A method as claimed in claim 9 further comprising computing to a loop free alternative repair path where available.

14. A computer readable volatile or non-volatile storage medium comprising one or more sequences of instructions which, when executed by one or more processors, cause the one or more processors to perform:
    forwarding data in a data communications network having as components nodes and links there between in which data for a receiving node, when the receiving node is operational, is forwarded via a primary path receiving node;
    forwarding the data to the receiving node, when the receiving node is not operational, via a repair path according to a repair capability, when a node in the primary path to the receiving node does not have the repair capability;
    computing a repair path around a failure component in the primary path, by:
        identifying a second node which is adjacent to the failure component;
        identifying a port of the second node to which the failure component would have normality forwarded the data:
        computing the repair path to an address having a repair identifier for the receiving node that is to the identified port of the second node and not via the failure component;
        wherein the repair path includes the first node and the second node.

15. The computer readable volatile or non-volatile storage medium of claim 14, wherein the repair path is computed or constructed after the receiving node becomes not operational.

16. An apparatus for forwarding data in a data communications network having as components nodes and links there between, the apparatus comprising:
one or more processors;
means for forwarding data for a receiving node, when the receiving node is operational, via a primary path receiving node;
means for forwarding data to the receiving node, when the receiving node is not operational, via a repair path according to a repair capability, when a node in the primary path to the receiving node does not have the repair capability;
computing a repair path around a failure component in the primary path, by:
identifying a second node which is adjacent to the failure component;
indentifying a port of the second node to which the failure component would have normally forwarded the data;
computing the repair oath to an address having a repair identifier for the receiving node is to the identified port of the second node and not via the failure component;
wherein the repair path includes the first node and the second node.

17. An apparatus as claimed in claim 16 in which the receiving node comprises a destination node for a data or a node on a primary path to a destination node.

18. An apparatus as claimed in claim 16, further comprising means for detecting failure of the failure component.

19. An apparatus as claimed in claim 18 further comprising means for invoking a bi-directional forwarding detection session with the receiving node over the failure component to detect failure thereof.

20. An apparatus as claimed in claim 18 in which the address having a repair identifier for the receiving node comprises a notvia address.

21. An apparatus as claimed in claim 18 in which the address having a repair identifier for the receiving node comprises an alternative topology address.

22. An apparatus as claimed in claim 18, further comprising means for computing a loop free alternate repair path where available.

23. The apparatus of claim 16, wherein the repair path is computed or constructed after the receiving node becomes not operational.

24. An apparatus comprising:
one or more processors;
a network interface communicatively coupled to the one or more processors and configured to communicate one or more packet flows among the one or more processors in a network; and
a computer readable medium comprising one or more sequences of instructions which, when executed by the one or more processors, cause the one or more processors to perform:
forwarding data in a data communications network having as components nodes and links there between in which data for a receiving node, when the receiving node is operational, is forwarded via a primary path receiving node;
forwarding the data to the receiving node, when the receiving node is not operational, via a repair path according to a repair capability, when a node in the primary path to the receiving node does not have the repair capability;
computing a repair path around a failure component in the primary path, by:
identifying a second node which is adjacent to the failure component;
identifying port of the second node to which the failure component would have normally forwarded the data;
computing the repair path to an address having a repair identifier for the receiving node that to the identified port of the second node and not via the failure component, if a node in the primary path to the receiving node does not have said repair capability;
wherein the repair path includes the first node and the second node.

25. The apparatus of claim 24, wherein the repair path is computed or constructed after the receiving node becomes not operational.

26. An apparatus for forwarding data in a data communications network having as components links and nodes, the apparatus comprising:
one or more processors;
first logic configured to forward data for a receiving node, when the receiving node is operational, via a primary path to a receiving node;
second logic configured to detect one or more other nodes in the network having a repair capability of computing a repair path around a failure component in the primary path to an address having a repair identifier for the receiving node not via the failure component;
third logic configured to forward data for the receiving node, when the receiving node is not operational, to one of said repair capable nodes upon failure of the failure component when the apparatus does not have said repair capability:,
fourth logic figured to compute a repair path around a failure component, by;
identifying a second port node which is adjacent to the failure component;
identifying a port of the second node to which the failure component would have normally forwarded the data;
computing the repair path to an address having a repair identifier for the receiving node that is to the identifier port of the second node and not via the failure component;
wherein the repair path includes the first node and the second node.

27. An apparatus as claimed in claim 26 comprising further logic configured to update a forwarding table of the apparatus upon detection of failure of the failure component so as to forward data for the receiving node to said repair capable node.

28. The apparatus of claim 26, wherein the repair path is computed or constructed after the receiving node becomes not operational.

29. A method of forwarding data in a data communications network having as components links and nodes, comprising:
forwarding data for a receiving node, when the receiving node is operational, via a primary path including a receiving node;
detecting one or more other nodes in the network having a repair capability of computing a repair path around a failure component in the primary path to an address having a repair identifier for the receiving node not via the failure component;
wherein computing a repair path around a failure component comprises:

identifying a second node which is adjacent to the failure component;

identifying a port of the second node to which the failure component would have normally forwarded the data;

computing the repair path to an address having a repair identifier for the receiving node that is to the identifier port of the second node and not via the failure component;

wherein the repair path includes the first node and the second node;

forwarding data to the receiving node, when the receiving node is not operational, to one of said repair capable nodes upon failure of the failure component if the apparatus does not have said repair capability;

wherein the method is performed by one or more processors.

30. The method of claim 29, wherein the repair path is computed or constructed after the receiving node becomes not operational.

* * * * *

UNITED STATES PATENT AND TRADEMARK OFFICE
CERTIFICATE OF CORRECTION

PATENT NO. : 7,808,890 B2
APPLICATION NO. : 11/839687
DATED : October 5, 2010
INVENTOR(S) : Ian Michael Charles Shand et al.

It is certified that error appears in the above-identified patent and that said Letters Patent is hereby corrected as shown below:

| | |
|---|---|
| Claim 1, column 11, line 38 | Please replace ";" with --:-- |
| Claim 14, column 12, line 60 | Please replace "normality" with --normally-- |
| Claim 16, column 13, line 20 | Please replace "identifying" with --identifying-- |
| Claim 16, column 13, line 23 | Please replace "oath" with --path-- |
| Claim 16, column 13, line 24 | Between "node" and "is" please insert --that-- |
| Claim 24, column 14, line 7 | Between "identifying" and "port" please insert --a-- |
| Claim 24, column 14, line 10 | Between "that" and "to" please insert --is-- |
| Claim 26, column 14, line 35 | Please replace ";" with --:-- |
| Claim 26, column 14, line 36 | Please replace "figured" with --configured-- |
| Claim 26, column 14, line 37 | Please replace ";" with --.-- |
| Claim 26, column 14, line 38 | Between "second" and "node" please delete "port" |

Signed and Sealed this
Seventeenth Day of January, 2012

David J. Kappos
*Director of the United States Patent and Trademark Office*